United States Patent
Beattie, Jr. et al.

(10) Patent No.: US 8,526,362 B2
(45) Date of Patent: Sep. 3, 2013

(54) DYNAMIC RECONFIGURATION OF CELL SITE SERVICE(S)

(75) Inventors: James Gordon Beattie, Jr., Bergenfield, NJ (US); Debebe Assefa Asefa, Eatontown, NJ (US); Stephen J. Griesmer, Westfield, NJ (US); Haywood Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 319 days.

(21) Appl. No.: 12/571,954

(22) Filed: Oct. 1, 2009

(65) Prior Publication Data

US 2011/0081897 A1    Apr. 7, 2011

(51) Int. Cl.
*H04W 4/00* (2009.01)

(52) U.S. Cl.
USPC ................................ 370/328; 455/446

(58) Field of Classification Search
None
See application file for complete search history.

(56) References Cited

U.S. PATENT DOCUMENTS

| | | | |
|---|---|---|---|
| 6,690,652 B1 * | 2/2004 | Sadri | 370/252 |
| 2004/0174847 A1 * | 9/2004 | Menon et al. | 370/328 |
| 2007/0222576 A1 * | 9/2007 | Miller et al. | 340/506 |
| 2008/0039089 A1 * | 2/2008 | Berkman et al. | 455/436 |
| 2008/0064361 A1 * | 3/2008 | Bjork et al. | 455/403 |
| 2008/0222251 A1 * | 9/2008 | Parthasarathy | 709/205 |
| 2008/0268861 A1 * | 10/2008 | Buracchini et al. | 455/452.1 |
| 2011/0092220 A1 * | 4/2011 | Bernini et al. | 455/452.2 |

* cited by examiner

*Primary Examiner* — Anh-Vu Ly
(74) *Attorney, Agent, or Firm* — Turocy & Watson, LLP

(57) ABSTRACT

The described subject matter relates to an architecture that can dynamically update or set facility variables for adapting cell site (e.g., base station) characteristics in a wireless communication network. In particular, based upon a current configuration or state of facility equipment as well as various operation data, the architecture can determine or infer a reconfiguration of a facility variable that can adjust the configuration or state of the facility equipment. The reconfiguration can be directed to improving efficiency, mitigating errors, and/or more effectively providing services and allocating resources.

21 Claims, 12 Drawing Sheets

DYNAMIC RECONFIGURATION OF CELL SITE SERVICE(S)

TECHNICAL FIELD

The present application relates generally to cell site or base station reconfiguration, and more specifically to automatic or dynamic reconfiguration of related equipment based upon various operation parameters.

BACKGROUND

Conventional base stations (e.g., cell sites) are configured to provide wireless coverage to mobile phones or other user equipment (UE) in a surrounding geographic service area. The service area for an individual base station can be adjusted according to a wide variety of facility equipment configurations or states. Such configurations of various facility variables can relate to a power level of broadcast signals, a sensitivity of received signals, a configuration of antennae included in the base station and so forth. For example, setting facility variables can affect the range of signals, thereby impacting the size and even the shape of an associated service area.

Typically, these configurations are set manually by a network engineer, site administrator or the like. Once set, the configuration is seldom, if ever, adjusted, since reconfiguration is conventionally also a manual process.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed herein, in one aspect thereof, comprises an architecture that can facilitate automatic and/or dynamic adjustments to facility variables associated with various service characteristics of a cell site in a wireless communication system. The architecture can include an interface component that can be adapted to interface to a set of base stations, each of which can be configured to serve user equipment (UE) within respective service areas. The architecture can also include a correlation component that can dynamically determine reconfiguration of a facility variable in order to influence a desired service area characteristic associated with a base station (or multiple base stations) included in the set. The correlation component can determine or infer the reconfiguration based upon at least two types of data: a current configuration of facility variables for the set of base stations and operation data for the set of base stations.

The architecture can further include a network controller component that can employ the interface component to automatically reconfigure the facility variable or multiple facility variables associated with bases stations included in the set. Hence, the architecture can identify issues associated with one or more base station, potentially in real time. Such issues can be, for example, an alarm or a high number of alarms from a base station, heavy utilization or capacity limits for a particular resource or other alarm conditions; usage statistics such as time-of-day trends, day-of-the-week trends, or other usage data; or latency conditions or other performance data. Based upon an assessment of these issues, the architecture can determine whether or not to reconfigure one or more base station in a manner that can mitigate or alleviate the identified issues.

In particular, the reconfiguration can relate to adjusting facility variables such as allocation of transport resources, power levels, sensitivity levels, antenna patterns, or the like. By adjusting these facility variables the service area (or another aspect) of one or more base station can be altered in size or shape (e.g., increase or reduce the service area), while that for other base stations can be altered as well in tandem. For instance, if one base station is in danger of overutilization, the service area for that base station can be reduced, while the service area for surrounding base stations can be increased to compensate. Additionally or alternatively, additional transport resource can be allocated to the alarming base station. Regardless, such changes can be implemented dynamically and potentially in real time without the necessity of a network engineering going on site and manually modifying the facility variable(s).

The following description and the annexed drawings set forth in detail certain illustrative aspects of one or more embodiments of the subject application. These aspects are indicative, however, of but a few of the various ways in which the principles of such embodiment(s) may be employed and thus, such embodiment(s) are intended to include all such aspects and their equivalents. Other advantages and distinguishing features of the embodiment(s) will become apparent from the following detailed description of the embodiment(s) when considered in conjunction with the drawings.

DETAILED DESCRIPTION

Figure 1:
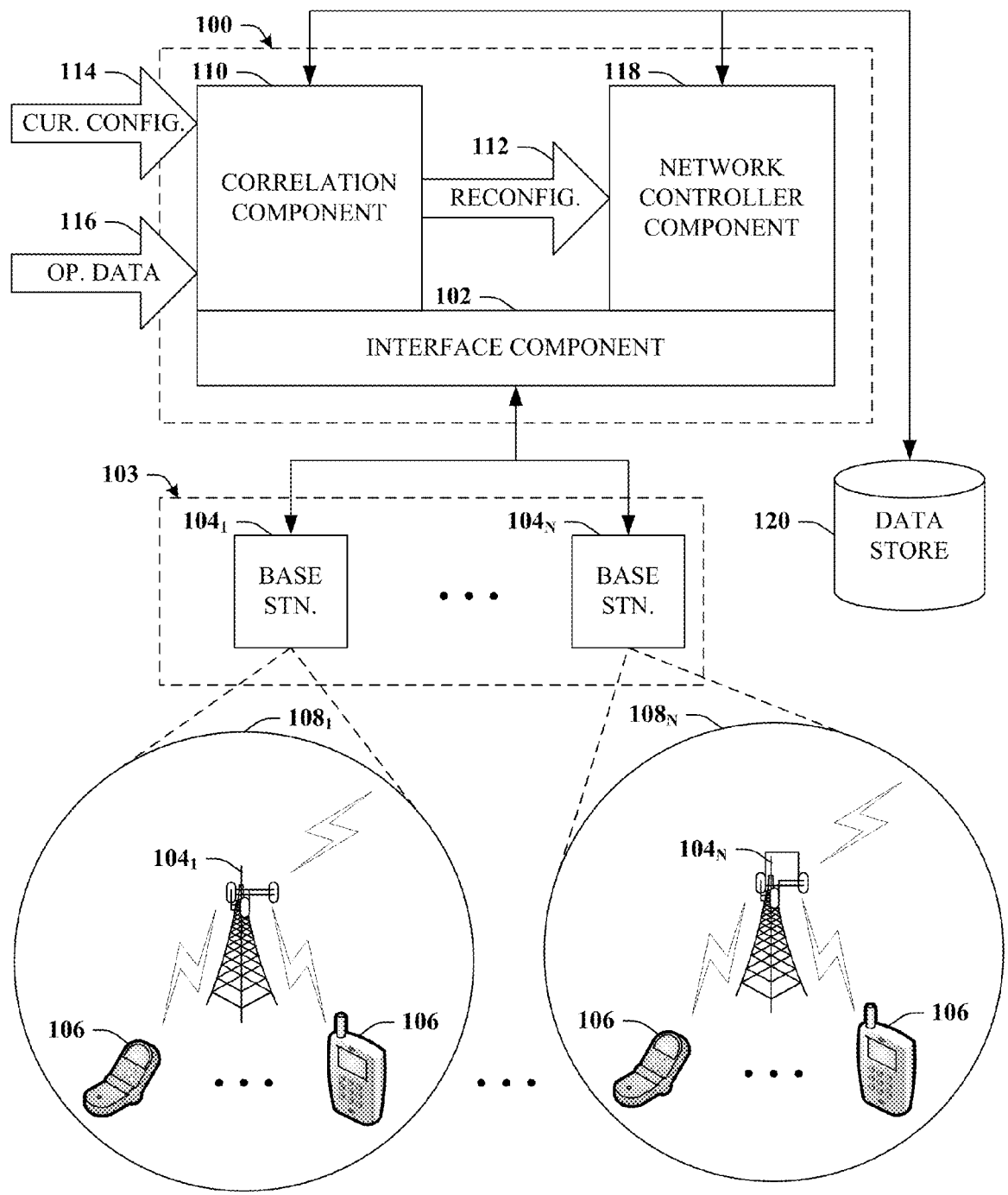
FIG. 1 is a block diagram of a system that can facilitate automatic and/or dynamic adjustments to one or more facility variable associated with various service characteristics of a cell site in a wireless communication network.

One or more embodiments of the subject application are now described with reference to the drawings, wherein like reference numerals are used to refer to like elements throughout. In the following description, for purposes of explanation, numerous specific details are set forth in order to provide a thorough understanding of the claimed subject matter. It may be evident, however, that the various embodiments may be practiced without these specific details. In other instances, well-known structures and devices are shown in block diagram form herein in order to facilitate describing the various embodiments.

As used in this application, the terms "system," "platform," "component," "framework," "interface," "node" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the various embodiments may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can facilitate automatic and/or dynamic adjustments to one or more facility variable associated with various service characteristics of a cell site in a wireless communication network is depicted. Generally, system 100 can include interface component 102 that can be configured to interface to set 103 of base stations $104_1$-$104_N$, wherein N can be substantially any positive integer. Base stations $104_1$-$104_N$ are hereinafter referred to, either collectively or individually as base station(s) 104, with individual subscripts employed generally only when illustrating distinguishing characteristics or to avoid confusion. Base stations 104 (e.g., cell sites) generally refer to a fixed station including towers, antennas, or other components or devices, each of which can be configured to serve multiple mobile devices such as cellular phones or other user equipment (UE) 106 within a respective geographic service area $108_1$-$108_N$ (referred to either collectively or individually as service area(s) 108) for the associated base station 104.

In addition, system 100 can further include correlation component 110 that can dynamically determine reconfiguration 112 of a facility variable to affect one or more desired service area 108 characteristic(s) associated with one or more base station(s) 104 included in set 103. The facility variable typically relates to configurable devices or aspects of wireless communication systems or services, which is further detailed in connection with FIG. 2A, infra. Often, the facility variable will relate to a configuration (e.g., current configuration 114) of equipment or components at base station(s) 104, but it should be appreciated that facility variables can also relate to other portions of a network, such as backhaul segments or the like. Regardless, it should be appreciated that correlation component 110 can determine reconfiguration 112 based upon various data inputs. Two examples of these data inputs can be, e.g., current configuration 114 of facility variables for set 103 (as well as facility variables for other portions of the network) and operation data 116. Operation data 116 is further discussed in connection with FIG. 2B.

Figure 2A:
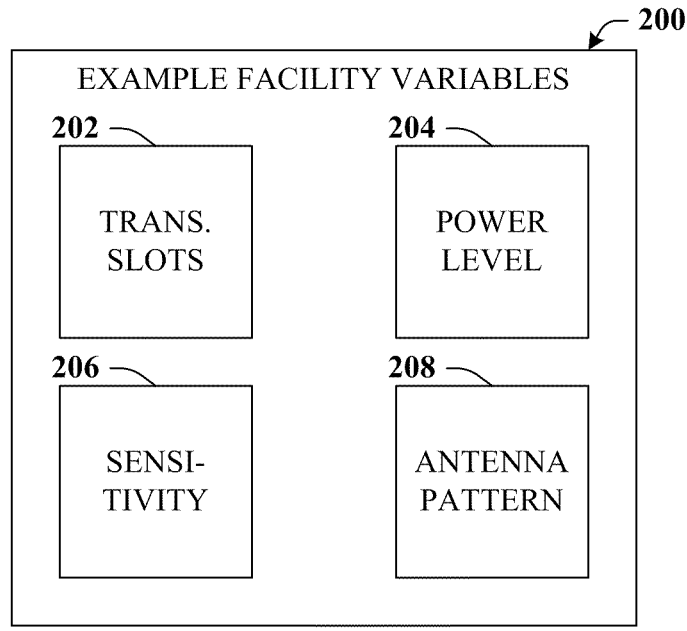
FIG. 2A provides a block diagram of illustration 200, which depicts various example facility variables.
Figure 2B:
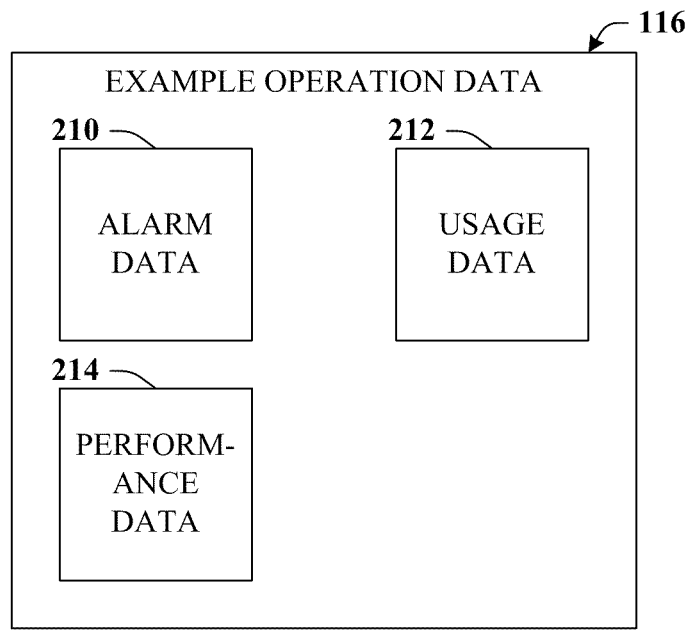
FIG. 2B depicts a block diagram of various examples of operation data 116 are provided.

While still referring to FIG. 1, but turning also to FIGS. 2A and 2B. With reference specifically to FIG. 2A, illustration 200 depicts various example facility variables, which can initially exist in a present state (e.g., current configuration 114), but can be modified in some manner (e.g., reconfiguration 112) in order to affect a desired service area characteristic. As depicted by reference numeral 202, the facility variable can relate to a number of transport slots available to or used by the base station 104 in question or an associated radio network controller (RNC) under a current configuration 114. For instance, reconfiguration 112 of the facility variable can relate to rerouting traffic over a first transport slot under current configuration 114 to a second transport slot associated with a disparate base station 104, RNC, base station controller (BSC), mobile switching center (MSC) or the like. Rerouting can also apply to one or both voice or data pathways or other carriers or services. It should be appreciated that transport slots 202 can relate to T1 lines, T3, lines, E1 lines, and so forth, and, further, that any such rerouting effectuated by reconfiguration 112 can relate to the radio side of a wireless communication system or service or to the backhaul side.

Two additional example facility variables can be power level 204 and sensitivity 206. Power level 204 is intended to refer to a power output level associated with one or more base station 104 included in set 103 under current configuration 114, whereas sensitivity 206 can relate to a radio receiver sensitivity associated with one or more base station 104 included in set 103 under current configuration 114. For example, correlation component 110 can determine (discussed infra in connection with FIG. 3) that either or both power level or sensitivity should be adjusted to effectuate a refinement or improvement over current service area characteristics. Such refinement or improvement can be defined by reconfiguration 112 of power level 204, sensitivity 206, or any other one or more suitable facility variable.

Yet another example facility variable can be antenna pattern 208. Antenna pattern 208 can apply to at least one antenna at one or more base station 108 included in set 103. Reconfiguration 112 can provide instructions to adjust (e.g., radio shaping and/or variable downtilt) antenna pattern 208. It should be appreciated that the facility variables described herein are intended to be exemplary in nature. Other variables can of course exist and be suitably employed in connection with the described subject matter. For example, correlation component 110 can command an update to a neighbor list, e.g., when reconfiguration 112 provides changes to facility variables that affect the size or shape of one or more base station service area(s) 108.

Now referring specifically to FIG. 2B, while still also considering FIG. 1, various examples of operation data 116 are provided. As noted previously, correlation component 110 can employ operation data 116 (e.g., along with current configuration 114) in order to determine reconfiguration 112. As illustrated, operation data 116 can be classified as alarm data 210, usage data 212, or performance data 214, however, it should be understood that other classification or data types can exist and be utilized in connection with the disclosed subject matter.

Alarm data 210 can be associated with equipment, components, devices, and so on that are included in one or more base station 104 from set 103. Appreciably, alarm data 210 can be associated with components relating to backhaul portions as well. On the other hand, usage data 212 can be associated with network traffic handled by one or more base station 104 included in set 103 and/or statistics or functions thereof. Likewise, performance data 214 can be associated with bit error rates, number or frequency of errors, latency, packet loss, CPU or other resource utilization, other quality of service (QoS) or other service-based attributes provided by one or more base station 104 included in set 103. Many of these features can relate to communication either upstream or downstream communications. Moreover, resource utilization can refer to both the radio side as well as the backhaul side. In some embodiments, performance data 214 can be included in (e.g., appropriately divided between) one or both alarm data 210 or usage data 212.

Continuing the discussion of FIG. 1, as discussed supra, correlation component 110 can dynamically determine reconfiguration 112 in accordance with what is detailed herein. Reconfiguration 112 as well as any suitable associated data can be provided to network controller component 118. Accordingly, network controller component 118 can employ interface component 102 to automatically reconfigure the facility variable(s) in question. Appreciably, by reconfiguring one or more facility variable, a wide range of wireless communication service features can be improved and/or adjusted in real time, particularly when responding to currently detected system stresses, or emergencies and/or to preemptively handle forecasted usage demands. Thus, services for subscribers can be improved while also reducing operations costs. For example, reconfiguring facility variables that affect wireless communication services as issues arise in order to deal with those issues can lead to fewer subscriber complaints or service alarms and therefore fewer customer care tickets to be addressed. Moreover, additional benefits can arise in mitigating outage times, reducing touch-time, as well as in pooling of network resources.

To the accomplishment of the above, current configuration 114 as well as other information can be stored to data store 120. Thus, upon receiving operation data 116, correlation component 110 can access current configuration 114 in order to make comparisons and/or inferences as to suitable reconfiguration 112. As used herein, data store 120 is intended to be a repository of all or portions of data, data sets, or information described herein or otherwise suitable for use with the described subject matter. Data store 120 can be centralized, either remotely or locally cached, or distributed, potentially across multiple devices and/or schemas. Furthermore, data store 120 can be embodied as substantially any type of memory, including but not limited to volatile or non-volatile, sequential access, structured access, or random access and so on. It should be understood that all or portions of data store 120 can be included in system 100, or can reside in part or entirely remotely from system 100.

Figure 3:
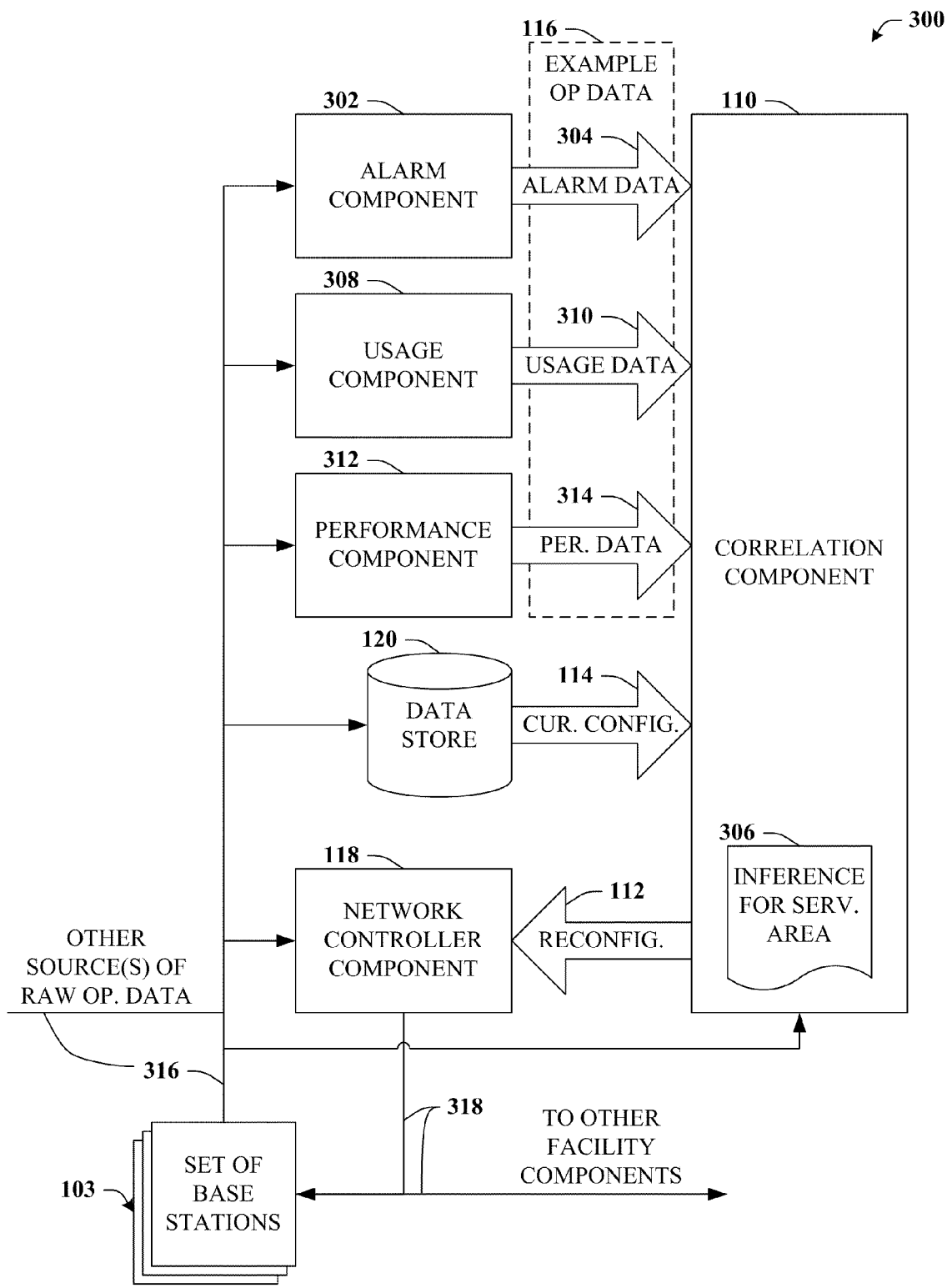
FIG. 3 illustrates a block diagram that can employ at least one of alarm data, usage data, or performance data in order to determine or infer reconfiguration 112.

Turning now to FIG. 3, system 300 that can employ at least one of alarm data, usage data, or performance data in order to determine or infer reconfiguration 112 is illustrated. In particular, system 300 can include correlation component 110 that can dynamically determine or infer reconfiguration 112. As discussed supra, correlation component 110 can construct reconfiguration 112 based upon current configuration 114 and operation data 116. Current configuration 114 can be acquired from all or a portion of base stations 104 included in set 103 as well as from other suitable facility components; or be acquired from data store 120. Likewise, raw data 316, either directly or upon one or more transformations, can be provided as operation data 116. Raw data 316 can be received from all or a portion of base stations 104 included in set 104 as well as other facility components or other sources of raw data 316, potentially in real time. In some cases (e.g., in the case of usage statistics or historic data) operation data 116 can be retrieved from data store 120 as well.

Moreover, system 300 can further include alarm component 302 that can determine a severity of an alarm issued by one or more base station 104. Hence, the alarm can be received as raw data 316 by alarm component 302 and propagated to correlation component 110 as alarm data 304, which can include all or a portion of raw data 116 (e.g., the alarm signal) as well as the severity or other determinations or inferences performed by alarm component 302. By way of illustration, the alarm can relate to, inter alia, capacity limits on transport resources between network elements (e.g., including both the radio side as well as the backhaul side); capacity limits on other radio resources (e.g., power, code, and/or frequency resources); radio interference, quality of a connection; dropped connections or hand-offs; issues at an associated router, access point, or gateway; or poor throughput, latency, or connectivity.

Based upon alarm data 304, correlation component 110 can dynamically infer, e.g., whether or not to extend or restrict all or a portion of one or more service area 108 for related base station(s) 104, which is denoted by reference numeral 306. Such can include service area 108 for base station 104 that issues an alarm as well as other base stations 104 that are adjacent to the alarming base station 104 or otherwise included in set 103. In particular, correlation component 110 can dynamically generate reconfiguration 112 of one or more facility variable for the alarming base station 104 or for adjacent or other base stations 104 included in set 103 in order to effectuate the extend or restricted service area 108 suggested by inference 306, any or all of which can be accomplished substantially in real time without manual changes by site administrators or engineers.

Hence, suppose numerous alarm messages are received by alarm component 302 indicating a relatively high number dropped calls for a particular base station 104. Correlation component 110 can, e.g., generate reconfiguration 112 that instructs the alarming base station 104 to reduce its service area 108, while contemporaneously instructing surrounding base stations 104, especially those with idle or available resources or those not exhibiting similar alarm issues, to expand their own service areas 108. Thus, the expanded service areas 108 for the surrounding base stations 104 can compensate for the reduced service area 108 of the alarming base station 104, while also mitigating the condition leading to alarms. Appreciably, the changes in services areas 108 might apply at least in part to only a particular service (e.g., the type of service exhibiting the alarms) or to other or all services provided by the alarming base station 104. Moreover, correlation component 110 might additionally or alternatively infer other types of changes, such as those effecting transport slots or the like.

Furthermore, system 300 can also include usage component 308 that can monitor raw usage data (e.g., included in raw data 316) in order to generate usage data 310 that can include current or recent utilization as well as trend utilization in connection with historic utilization. For example, usage component 308 can identify time-of-day trends, day-of-week trends with respect to traffic associated with each base station 104 included in set 103. Based upon trending analysis, correlation component 110 can forecast expected times of heavy traffic for certain base stations 104, and preemptively instruct changes to service areas 108 (or other suitable changes) in order to tailor the service areas 108 for set 103 in more effectively handle upcoming or predict utilization. In other words, correlation component 110 can dynamically infer whether or not to extend or restrict all or a portion of service area 108 provided by one or more base stations 104 included in set 103 based at least in part upon usage data 310. Correlation component 110 can dynamically generate reconfiguration 112 of one or more facility variable in order to effectuate this extended or restricted service area 108 in a manner that more efficiently employs available resources based upon current traffic or projected traffic trends. Appreciably, correlation component 110 can do so not only based upon identified trends, but in an adaptive manner connection with existing unforeseen issues or alerts that are identified.

For example, consider the case in which a first base station 104 is known to serve a very high volume of calls every weekday between the hours of 5:00 pm and 7:00 pm. Correlation component 110 can, say, between the hours of 4:30 pm and 7:30 pm every weekend reduce service area 108 of first base station 104, while increasing the service area 108 of a second base station 104 deemed most adequate for sharing the high volume of calls. However, at 4:30 pm it is identified that the second base station 104 is exhibiting unrelated issues. In that case, correlation component 110 can infer that a substitute to the normal aid provided by second base station 104 in handling the high call volume trend of the first base station 104 should be employed. Thus, a third base station 104, which can also be adjacent to the first or second base station 104 can be employed to entirely or in part handle a service area 108 that is normally allocated to the first or the second base station 104.

In addition, system 300 can also include performance component 312 that can monitor raw qualitative performance (e.g., based upon raw data 316) of service characteristics associated with set 103. Performance component 312 can propagate performance data 314, whether raw or transformed in some manner, including other determinations or inferences drawn from such data, to correlation component 110. For illustrative purposes, performance data 314 can relate to one or more of a bit error rate, a number of errors, a frequency of errors, latency packet loss, CPU utilization or the like, all or a portion of which can apply to resources positioned either on the radio side of the network or the backhaul portion of the network.

Accordingly, correlation component 110 can dynamically infer whether or not to extend or restrict all or a portion of service area 108 provided by one or more base station 104 included in set 103 based at least in part upon performance data 314. To the accomplishment of the above, correlation component 110 can dynamically generate reconfiguration 112 of one or more facility variable for one or more base station 104 included in set 103 in order to effectuate an extended or restricted service area 108. It should be underscored that correlation component 110 can produce reconfiguration 112 based upon not only one type of operation data 116, but based upon all or any combination of operation data 116 (e.g., alarm data 304, usage data 310, performance data 314). Moreover, reconfiguration 112 will typically include a set of instructions 318 that can be interpreted by target equipment or components in order to effectuate the desired changes to facility variables. Thus, upon receipt of reconfiguration 112, base stations 104 or other facility components can automatically adjust the route for traffic as well as alter the size, shape, or scope of a given service area 108 such that the provided services can be collectively or selectively extended or restricted in order to better meet the needs of subscribers.

Furthermore, in one or more aspect of the disclosed subject matter, correlation component 110 can examine operation data generated after reconfiguration 112 is constructed and/or propagated to target facilities or components thereof. Accordingly, correlation component 110 (e.g., by monitoring subsequent operation data 116) can determine an impact assessment that can describe an impact on services provided by one or more bases station 104 included in set 103. Correlation component 110 can utilize the impact assessment in order to iteratively and automatically refine or improve subsequent reconfiguration 112 characteristics and/or service characteristics or quality.

Figure 4A:
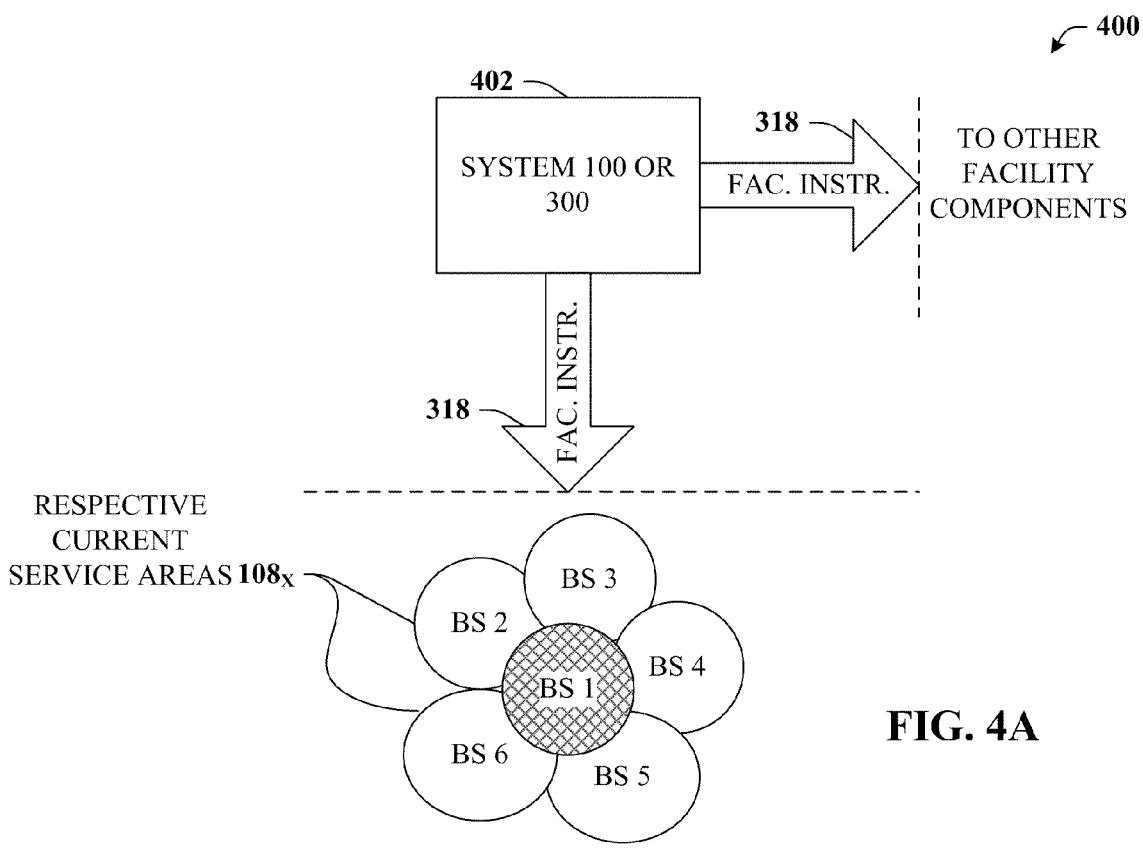
FIG. 4A provides illustration 400, which depicts respective current service areas 108 an issue arises with a base station.
Figure 4B:
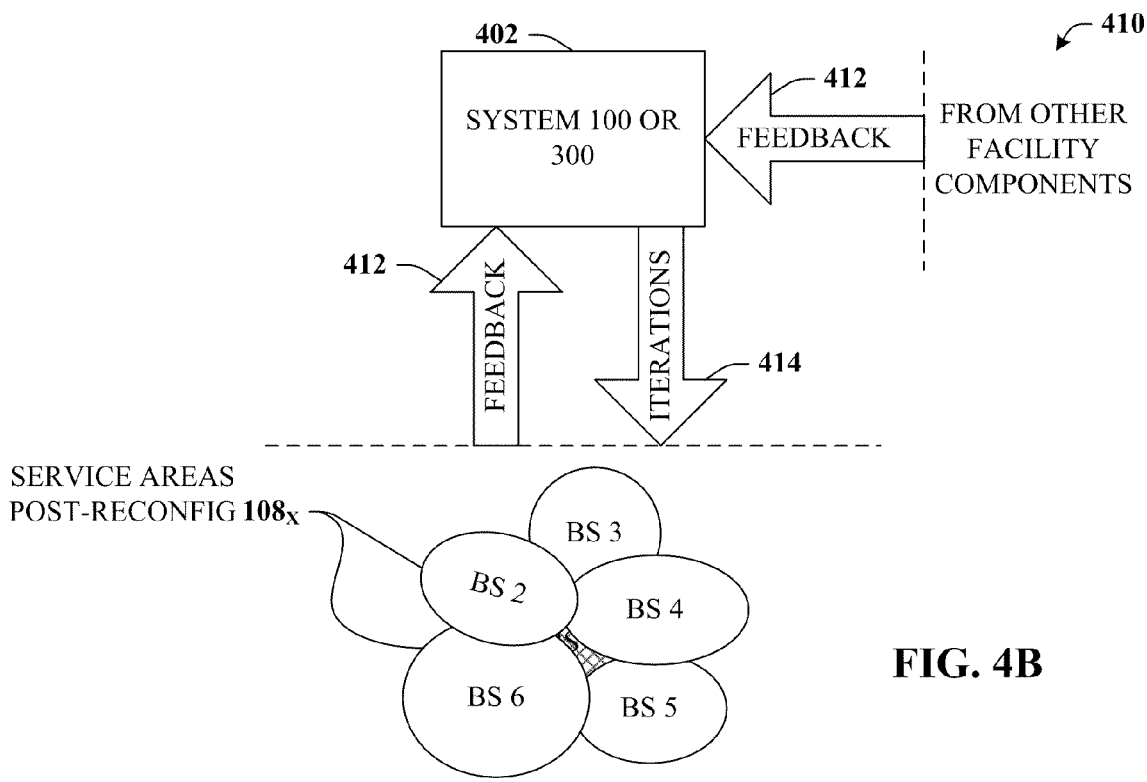
FIG. 4B provides illustration 410, which depicts respective service areas 108 after reconfiguration.

Referring now to FIGS. 4A and 4B, illustration 400 of FIG. 4A depicts respective current service areas 108 an issue arises with a base station. In particular, service areas 108 for base stations 1-6 are exhibited. Cross-hatches appear overlaid on the service area 108 for base station 1 to indicate an issue of some kind, whether based upon alarm data 304, usage data 310, or performance data 314. As detailed supra in connection with systems 100 and 300 (here denoted as block 402) correlation component 110 can generate reconfiguration 112, which can include facility instructions 318 to handle the issue that has arisen. Such facility instructions 318 can be delivered to one or more base stations (e.g., to modify service areas 108, reroute or reallocate pathways . . . ) or to other facility components.

In this example, it is determined that the service area 108 for base station 1 should be limited, with surrounding base stations 2-6 compensating for the reduction, which can be included in facility instructions 318, the results of which can be viewed with reference to illustration 410 of FIG. 4B, which depicts respective service areas 108 after reconfiguration. As shown, service areas 108 for base stations 2, 4, 5, 6 are expanded to cover the respective portions that were previously served by base station service area 1. Moreover, as discussed supra, various feedback 412 can be received after implementation of any modifications in order to monitor the outcome, potentially in real time. Thus, iterative changes 414 can be provided (e.g., in the form of subsequent reconfigurations 112) to refine operation of all suitable facilities or components thereof.

Figure 5A:
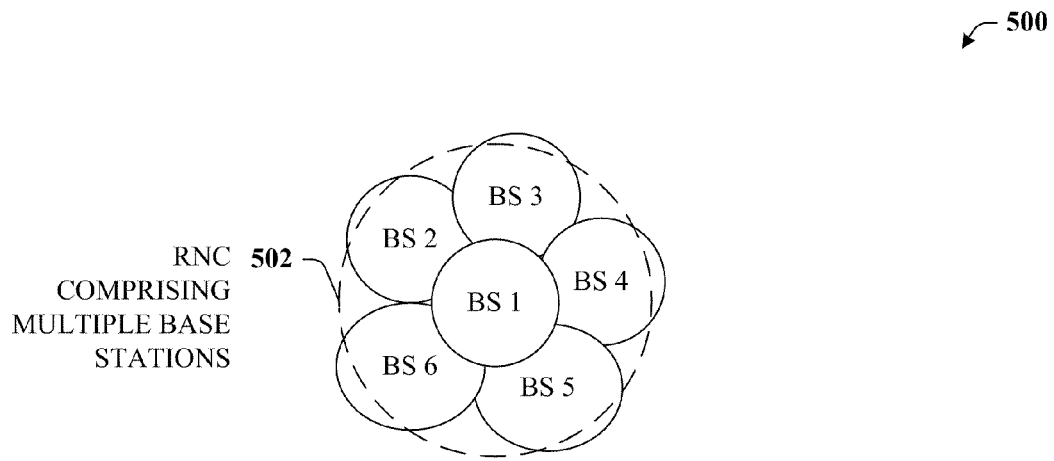
FIG. 5A provides illustration 500 of a service area 502 for a radio network controller (RNC) that is composed of the service areas for multiple base stations.
Figure 5B:
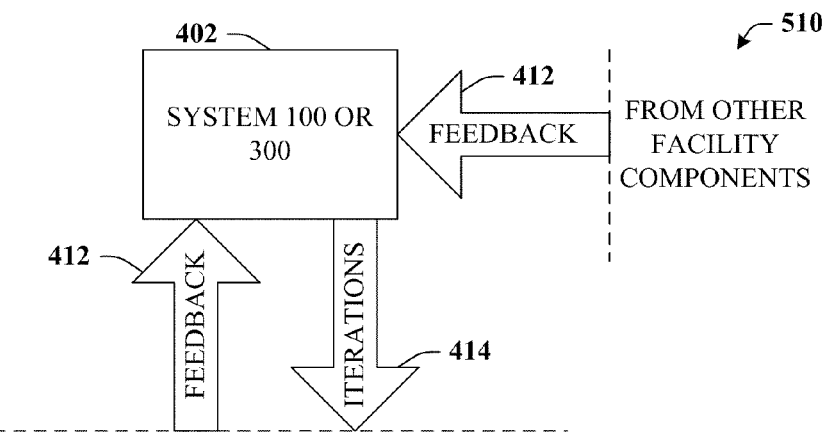
FIG. 5B depicts illustration 510, which depicts RNC service area 502 that can be modified by correlation component 110 or other components.
Figure 5B:
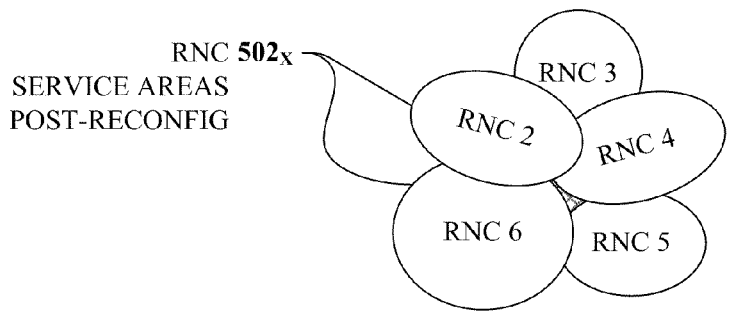

With reference now to FIGS. 5A and 5B, FIG. 5A depicts illustration 500 of a service area 502 of a radio network controller (RNC) that is composed of the service areas for multiple base stations. Accordingly, it is readily apparent that the features detailed supra can be extrapolated to the RNC level of suitable networks. Thus, in connection with FIG. 5B, illustration 510 depicts RNC service areas 502 can be modified by correlation component 110 or other components in a manner similar to that described herein. In this example, a service area 502 of an occluded RNC 1 has been subsumed by surrounding RNC service areas 2-6, just as was the case for service area 108 for base station 1 in connection with FIG. 4B when issues with service from that base station were detected.

Figure 6:
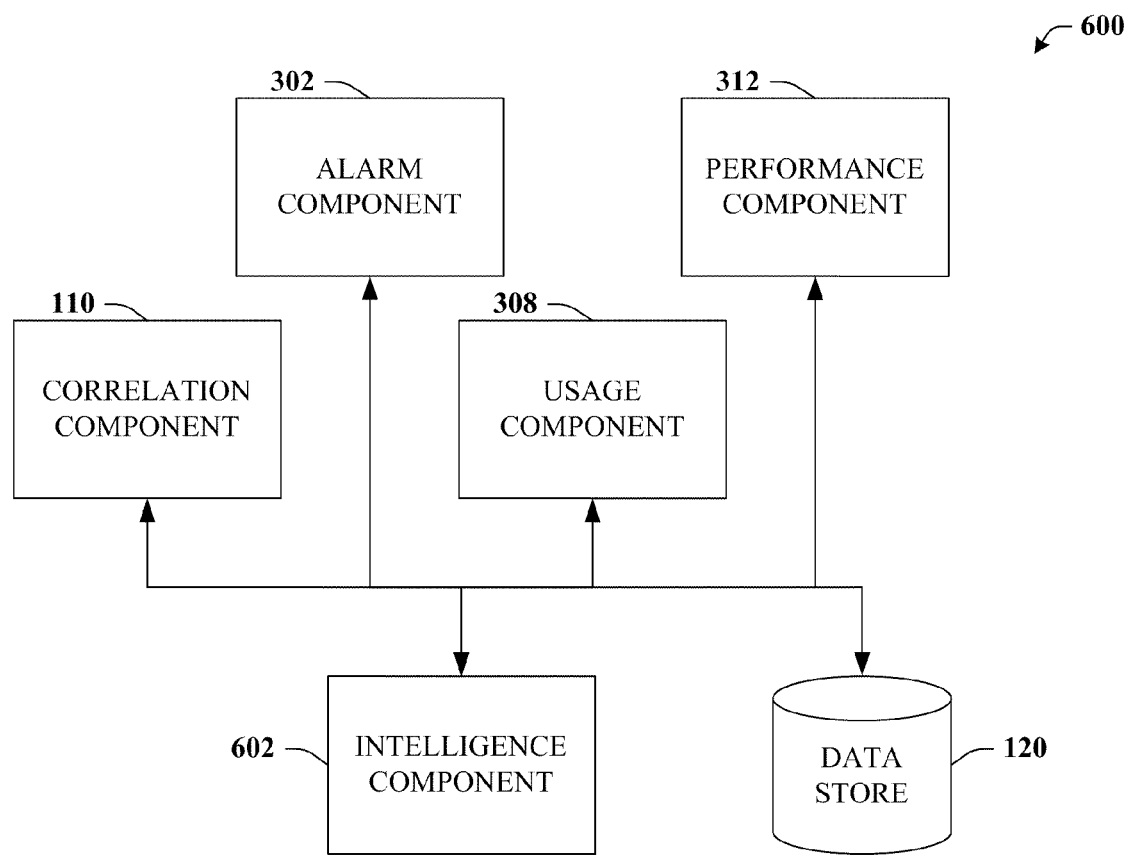
FIG. 6 illustrates a block diagram of a system that can perform or aid with various determinations or inferences

Now turning to FIG. 6, system 600 that can perform or aid with various determinations or inferences is illustrated. Generally, system 600 can include correlation component 110, alarm component 302, usage component 308, and performance component 312 as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, alarm component 302 can intelligently determine or infer alarm severity from raw data 316 as well as other suitable inferences relating to equipment alarms or the like. Similarly, usage component 308 can intelligently determine or infer the usage trends or other beneficially employed usage statistics, for example by identifying patterns or the like. Likewise, performance component 312 can intelligently determine or infer similar aspects of raw performance data, e.g., in connection with various recognition techniques, which themselves can rely upon intelligent determinations. Correlation component 110 can also facilitate various intelligent determination or inferences with a particular data set or in conjunction with multiple data sets, as detailed herein.

In addition, system 600 can also include intelligence component 602 that can provide for or aid in various inferences or determinations. In particular, in accordance with or in addition to what has been described supra with respect to intelligent determinations or inferences provided by various components described herein, e.g., all or portions of correlation component 110, alarm component 302, usage component 308, and performance component 312. Additionally or alternatively, all or portions of intelligence component 602 can be included in one or more components described herein. Moreover, intelligence component 602 will typically have access to all or portions of data sets described herein, such as data store 120.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
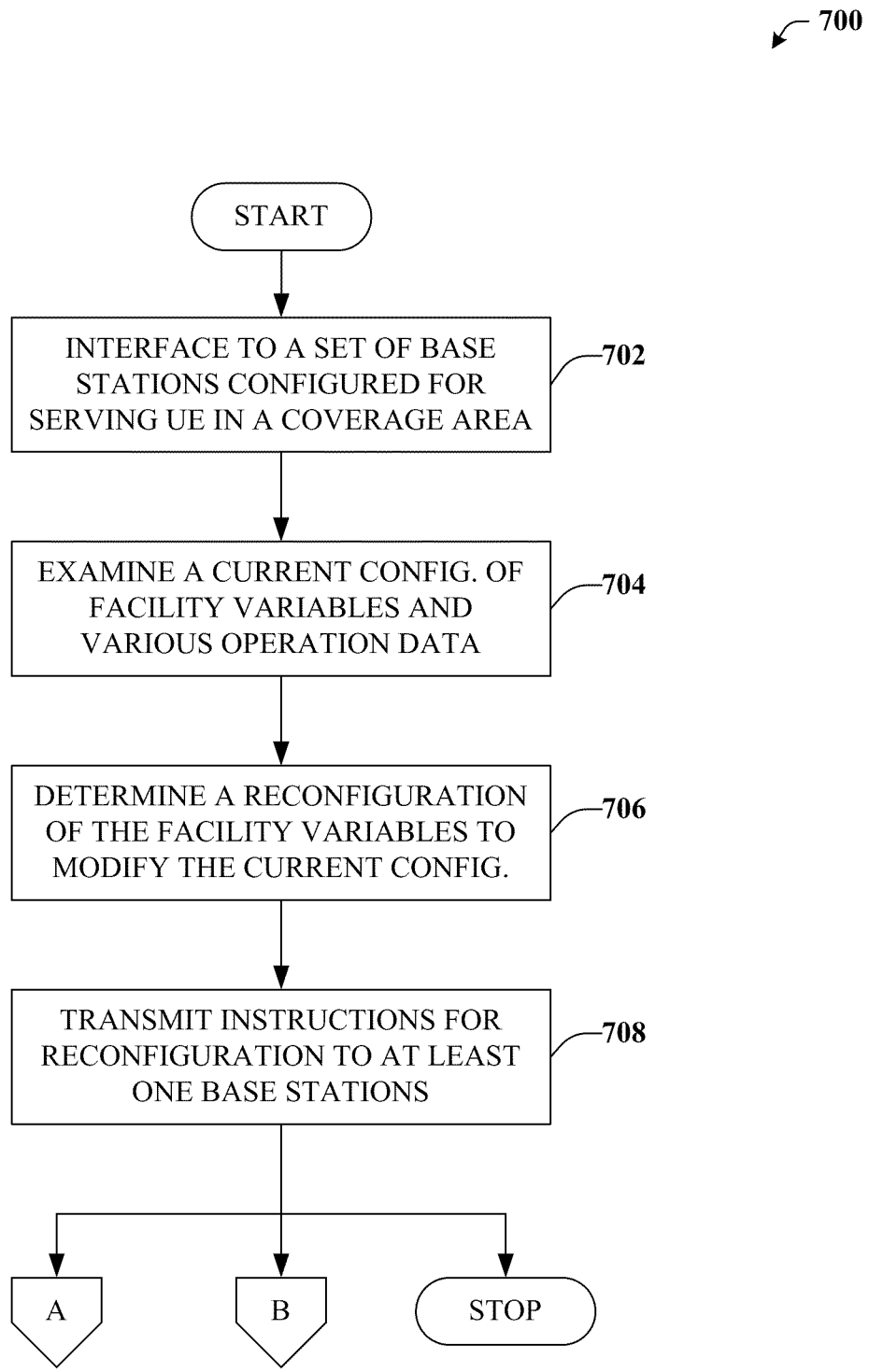
FIG. 7 is an exemplary flow chart of procedures that define a method for automatically or dynamically setting facility variables for adapting cell site service characteristics in a wireless communication network.
Figure 8:
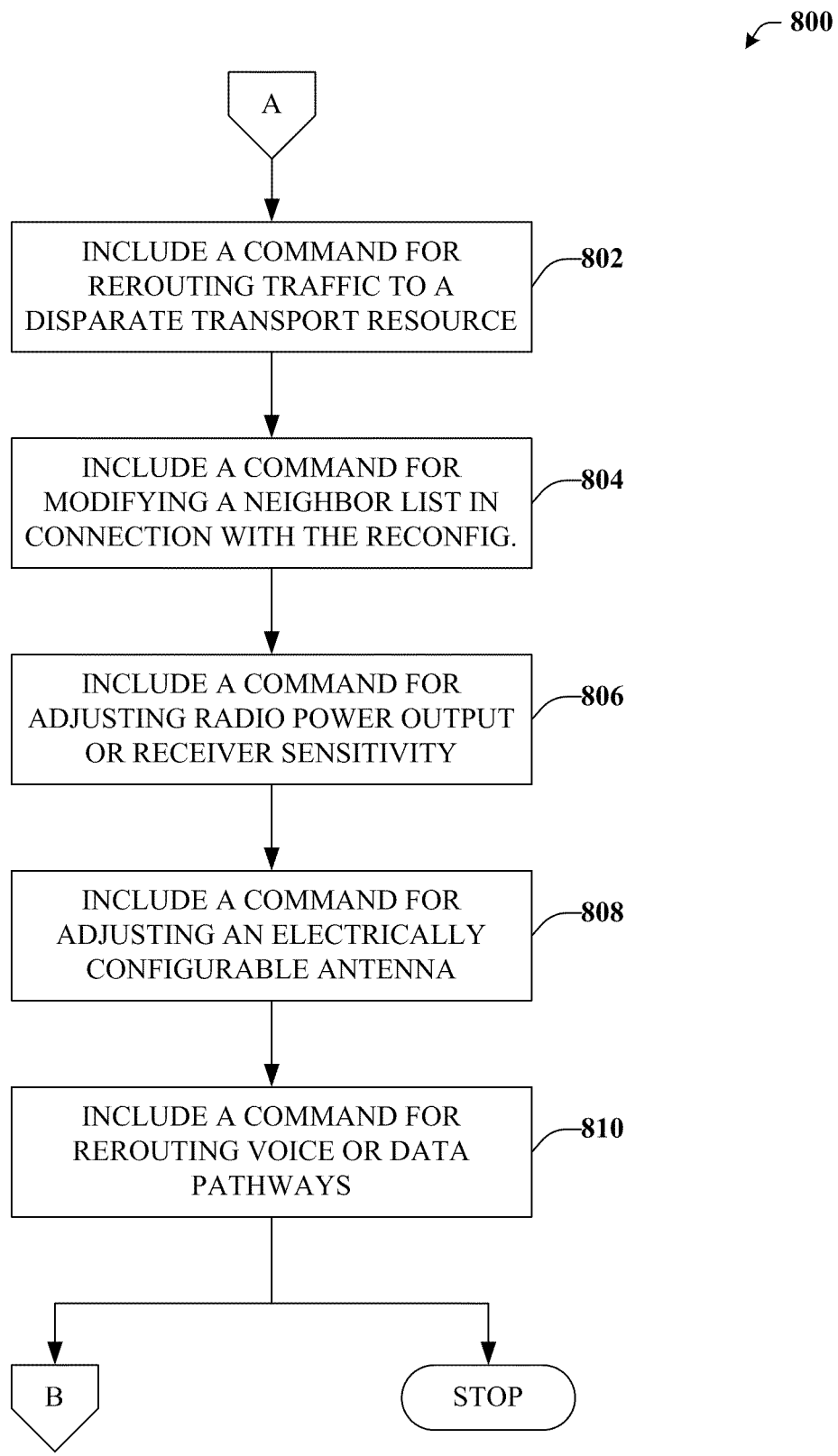
FIG. 8 is an exemplary flow chart of procedures that define a method for including various features or aspects in the transmitted instructions.
Figure 9:
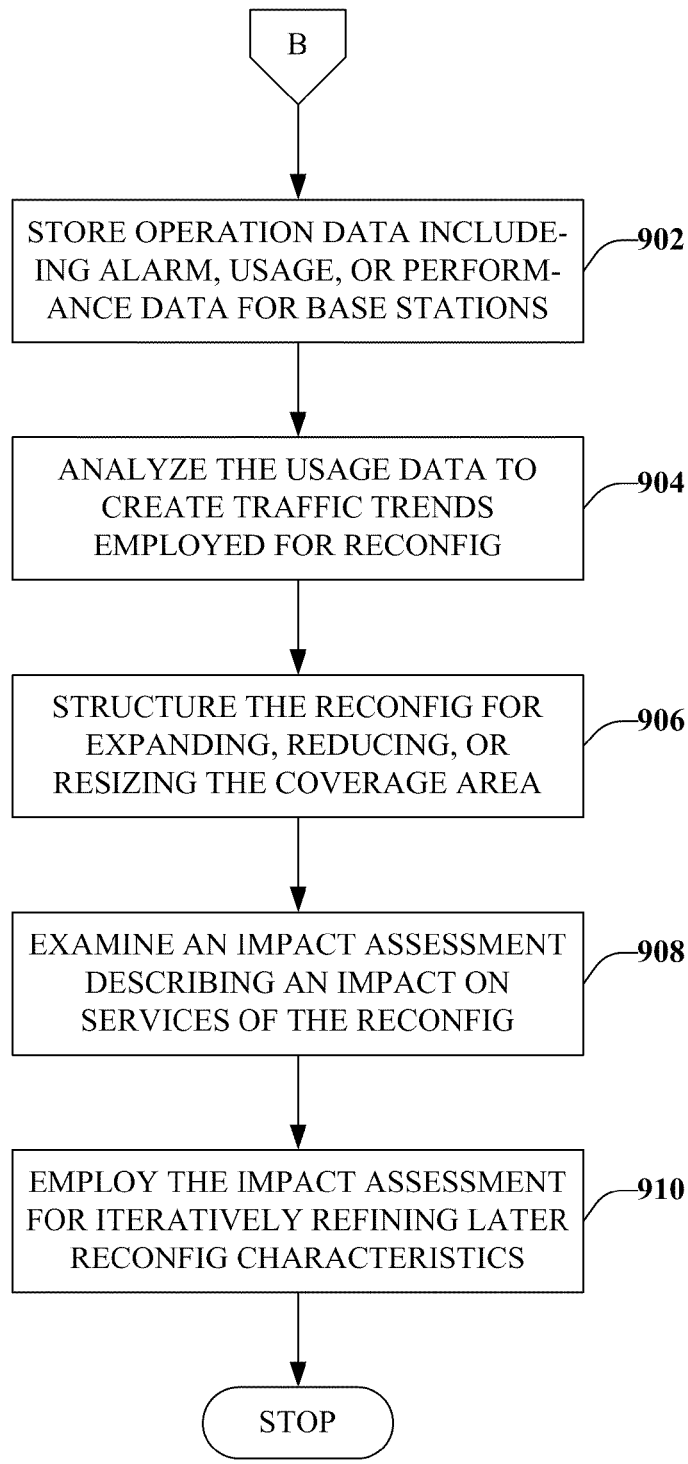
FIG. 9 depicts an exemplary flow chart of procedures defining a method for providing addition features or aspects in connection with setting facility variables for adapting cell site service characteristics in a wireless communication network.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary method 700 for automatically or dynamically setting facility variables for adapting cell site service characteristics in a wireless communication network is illustrated. Generally, at reference numeral 702, a set of base stations can be interfaced to, wherein each base station in the set can be configured for service user equipment (UE) in a respective coverage area. Hence, at reference numeral 704, a current configuration of one or more facility variable associated with at least one base station included in the set can be examined. The current configuration can be examined along with various operation data for the at least one base station.

Next to be described, at reference numeral 706, a reconfiguration of the one or more facility variable can be dynamically determined or inferred based upon the examination of the current configuration and operation data discussed at reference numeral 704. The reconfiguration can be determined or inferred with the goal of modifying the current configuration in a more productive or efficient manner. Therefore, at reference numeral 708, instructions for reconfiguring the one or more facility variable can be transmitted to the at least one base station.

With reference now FIG. 8, exemplary method 800 for including various features or aspects in the transmitted instructions is provided. At reference numeral 802, a command for rerouting traffic from a transport resource associated with the at least one base station to a disparate transport resource can be included in the instructions. Appreciably, such a rerouting can apply to transport resources directly linked to the at least one base station or to those resources employed on a backhaul portion of the network.

At reference numeral 804, a command for modifying a neighbor list in connection with the reconfiguration can be included in the instructions. Appreciably, modification of the neighbor list can be recommended when the reconfiguration specifies an alteration to one or more service areas associated with the at least one base station, such as that described infra in connection with reference numeral 906 of FIG. 9. At reference numeral 806, a command for adjusting radio power output or radio receiver sensitivity can be included in the instruction. The adjustment of radio power output or radio receiver sensitivity can apply to equipment associated with the at least one base station.

Additionally or alternatively, at reference numeral 808, a command for adjusting an electrically configurable antenna can be included in the instructions. Such can lead to suitable radio shaping or otherwise changing the size, shape, scope, or another characteristic of a service area for the at least one base station. Moreover, at reference numeral 810, a command for rerouting a voice or data pathway can be included in the instruction.

Turning briefly to FIG. 9, an exemplary method 900 for providing addition features or aspects in connection with setting facility variables for adapting cell site service characteristics in a wireless communication network is depicted. At reference numeral 902, at least one of alarm data, usage data, performance data, or combinations thereof can be stored as operation data that is associated with all or a portion of the set of base stations. Such information can be stored for later access or recall, particularly, in connection with constructing the reconfiguration determined or inferred at reference numeral 706.

At reference numeral 904, the usage data can be analyzed for generating time-of-day traffic trends, day-of-the-week traffic trends, or other traffic or usage trends such as, e.g., based upon holidays or geographic events within one or more coverage areas. Moreover, all or a portion of these trends can be employed for determining or inferring the reconfiguration determined or inferred at reference numeral 706

Furthermore, at reference numeral 906, the reconfiguration can be structured for expanding, reducing, and/or resizing the coverage area for one or more base station included in the set. At reference numeral 908, an impact assessment describing an impact on services provided by the one or more base stations can be examined following the reconfiguration. Thus, the impact assessment can be based upon feedback from facilities or components thereof that underwent alterations due to the reconfiguration. At reference numeral 910, the impact assessment can be employed for iteratively and/or automatically refining subsequent reconfiguration characteristics.

Figure 10:
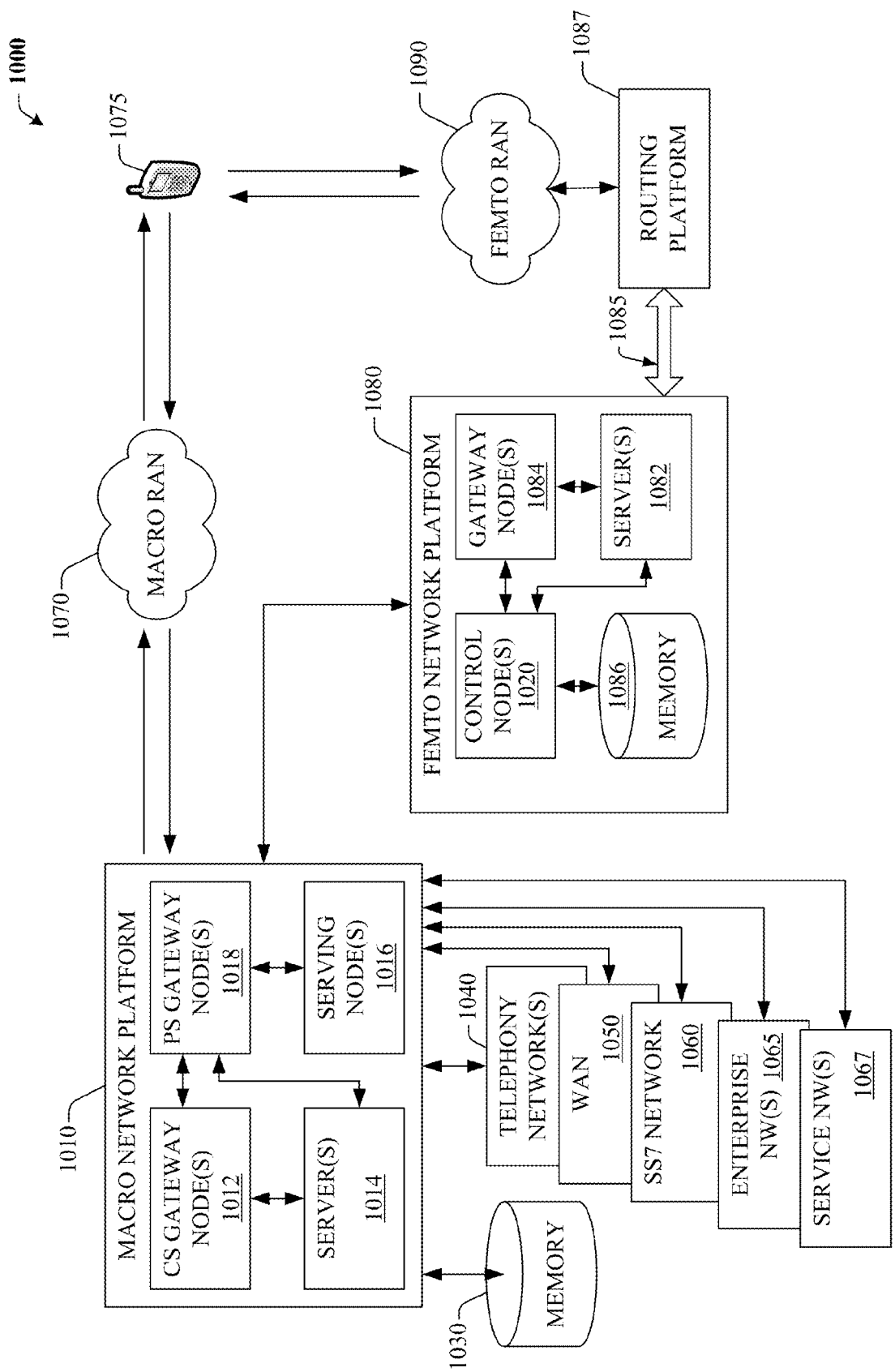
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities and can be substantially similar to the control component 320 (FIG. 3) and can include functionality thereof.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
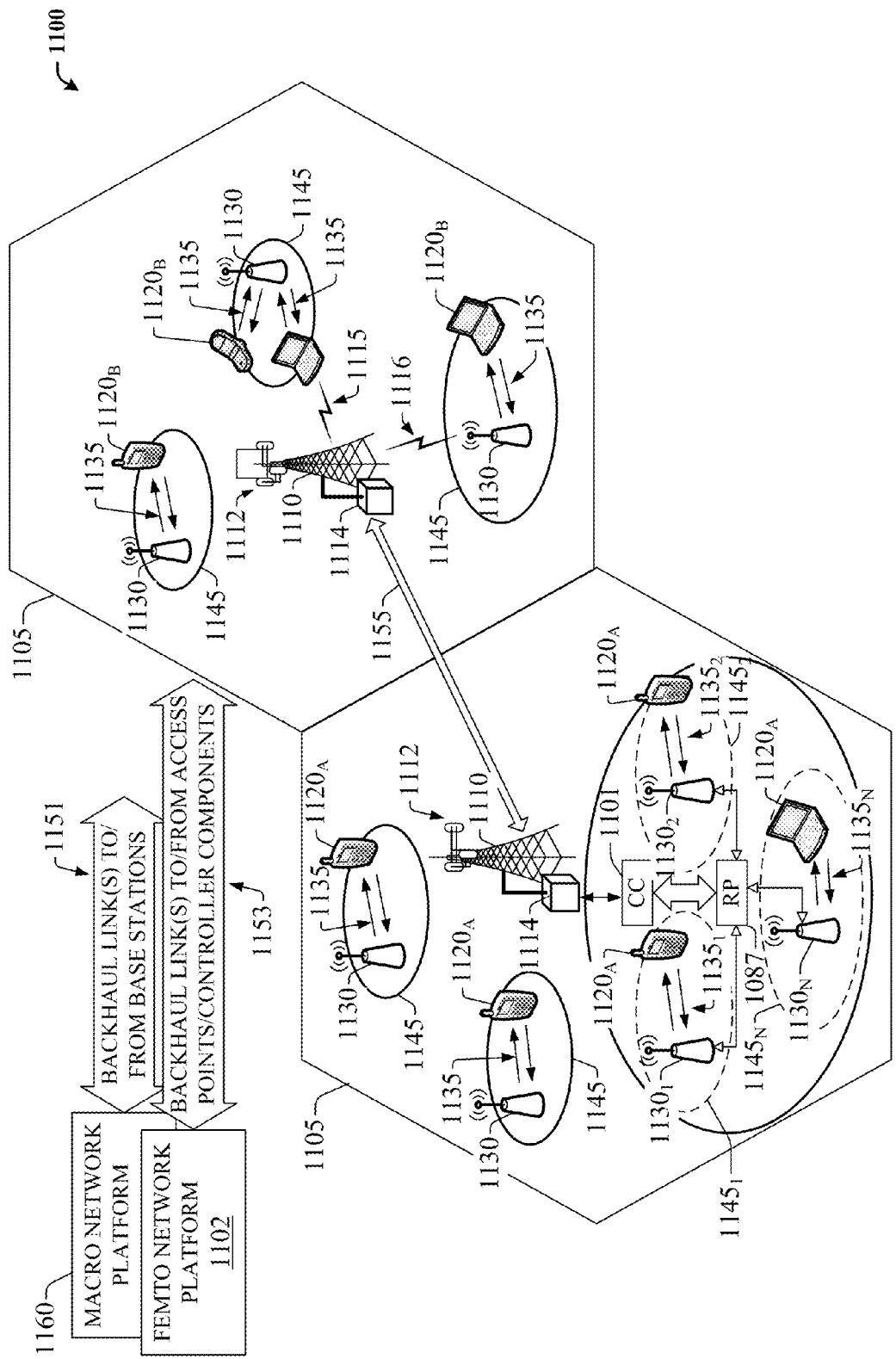
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage, each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE $1120_A$, $1120_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE $1120_A$, $1120_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs $1120_A$ can be routed by the RP 102, for example, internally, to another UE $1120_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points $1130_1$-$3730_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE $3720_A$ connected to femto APs $1130_1$-$3830_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
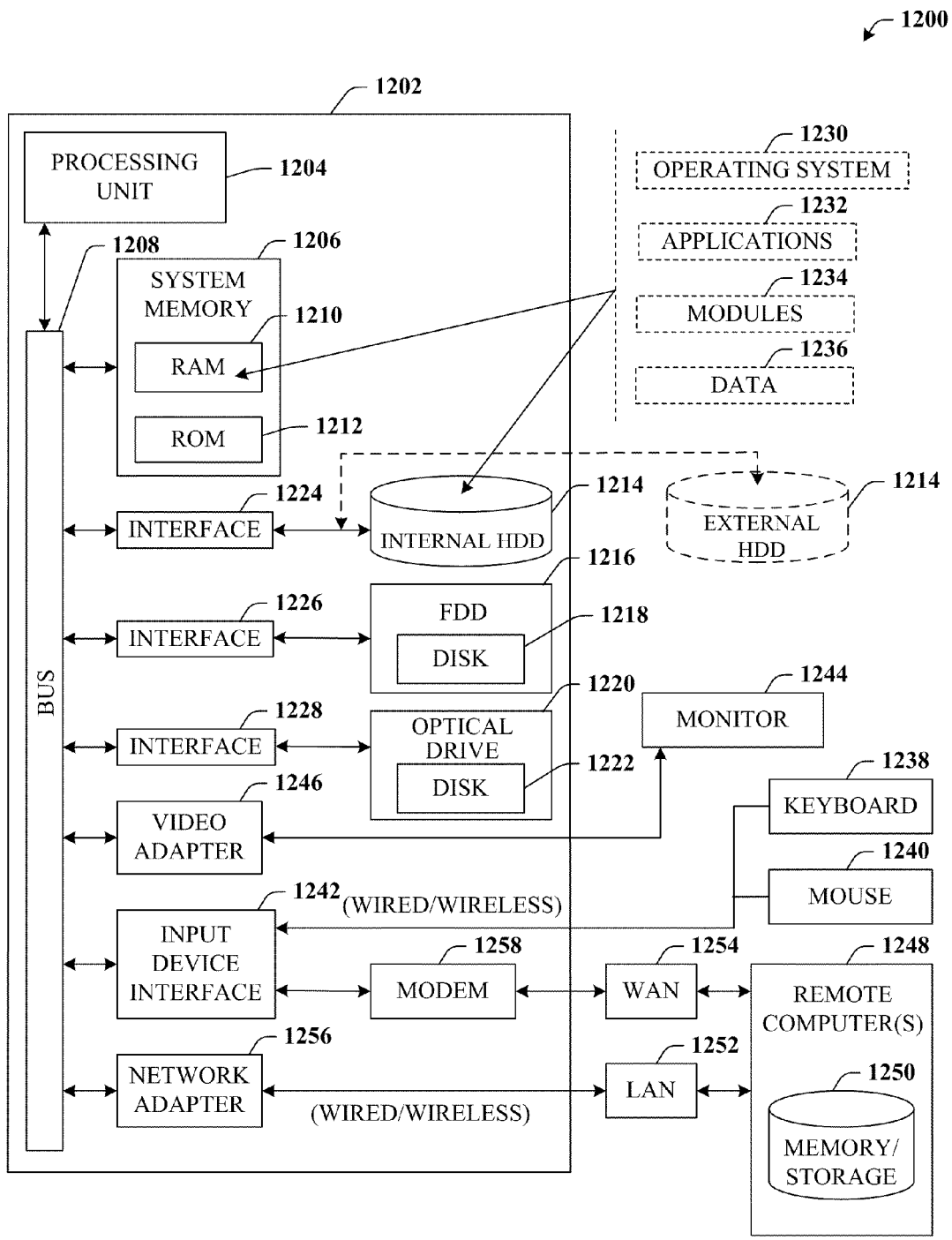
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the claimed subject matter, FIG. 12 and the following discussion are intended to provide a brief, general description of a suitable computing environment 1200 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the claimed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10 BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the claimed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
    a memory to store instructions; and
    a processor, coupled to the memory, that facilitates execution of the instructions to perform operations, comprising:
        determining a reconfiguration of a facility variable that changes a service area characteristic associated with a base station device in a set of base station devices that serve user equipment within respective service areas, wherein the reconfiguration is determined based upon a current configuration of facility variables, comprising the facility variable, for the set of base station devices and operation data for the set of base station devices, wherein the reconfiguration comprises a rerouting of network traffic from a first transport slot to a second transport slot that is associated with a different base station device in the set of base station devices than the first transport slot;
        reconfiguring the facility variable based upon the reconfiguration of the facility variable via communication with the base station device;
        determining a value representing a severity of an alarm issued by an alarming base station device from the set of base station devices and sending alarm data comprising the value; and
        determining whether to extend or restrict a portion of a service area served by the base station device based at least in part upon the alarm data.

2. The system of claim 1, wherein the facility variable relates to a number of transport slots available to traffic of the base station device.

3. The system of claim 1, wherein the operation data relates to alarm data associated with equipment in the set of base station devices.

4. The system of claim 1, wherein the alarm relates to capacity limits on transport slots between network elements.

5. The system of claim 1, wherein the operations further comprise facilitating an extended or restricted service area based upon application of the reconfiguration of the facility variable for the base station device.

6. The system of claim 1, wherein the operations further comprise monitoring usage information and generating usage data comprising current utilization data and historic utilization data for traffic associated with the set of base station devices, and transmitting the usage data.

7. The system of claim 6, wherein the determining whether to extend or restrict comprises determining whether to extend or restrict the portion of the service area provided by the base station device based at least in part upon the usage data.

8. The system of claim 7, wherein operations further comprise initiating the reconfiguration of the facility variable for the base station device and facilitating an extended or restricted service area that reallocates available resources based upon a traffic trend.

9. The system of claim 1, wherein the operations further comprise monitoring qualitative performance of service characteristics associated with the set of base station devices, and sending performance data representing the qualitative performance, wherein the performance data relates to error information.

10. The system of claim 9, wherein the determining whether to extend or restrict comprises determining whether to extend or restrict the portion of the service area provided by the base station device based at least in part upon the performance data.

11. The system of claim 9, wherein operations further comprise initiating the reconfiguration of the facility variable for the base station device and facilitating an extended or restricted service area.

12. The system of claim 1, wherein operations further comprise analyzing updated operation data generated after the reconfiguration and determining impact assessment data that describes an impact on services provided by the base station device.

13. The system of claim 12, wherein the operations further comprise utilizing the impact assessment data in connection with iterative refinement of subsequent reconfiguration characteristics.

14. The system of claim 1, wherein the alarming base station device is a same base station device as the base station device.

15. The system of claim 1, wherein the different base station device is adjacent to the base station device.

16. A method, comprising:
    examining, by a system comprising a processor, a current configuration of a facility variable associated with a base station device in a set of base station devices in connection with operation data for the base station device, wherein the set of base station devices service user equipment in respective coverage areas;
    determining, by the system, a reconfiguration of the facility variable comprising modifying the current configuration, wherein the modifying comprises rerouting network traffic from a first transport slot to a second transport slot that is associated with a different base station from the set of base station devices than the first transport slot;

transmitting, by the system, an instruction to reconfigure the facility variable to the base station device;

storing, as operation data by the system, alarm data comprising a representation of a severity of an alarm received from an alarming base station device from the set of base station devices; and determining, by the system, whether to extend or restrict a portion of a coverage area for the base station device in response to receipt of the alarm data.

17. The method of claim 16, wherein the transmitting comprises transmitting a command to reroute traffic from a transport resource associated with the base station device to a disparate transport resource.

18. The method of claim 17, further comprising analyzing, by the system, usage data associated with a usage date to generate a traffic trend and determining the reconfiguration as a function of a portion of the traffic trend.

19. A computer readable storage device comprising instructions that, in response to execution, cause a system comprising a processor to perform operations, comprising:

determining a reconfiguration of a facility variable to affect a coverage area characteristic associated with a base station device from a set of base station devices that comprise multiple radio network controller service areas and serve user equipment within respective coverage areas, wherein the reconfiguration is based upon a current configuration of facility variables, comprising the facility variable, for the set of base station devices according to the multiple radio network controller service areas, and operation data for the set of base station devices according to the multiple radio network controller service areas, wherein the reconfiguration comprises rerouting network traffic from a first transport slot to a second transport slot that is associated with a different base station device from the set of base station devices than the first transport slot;

reconfiguring the facility variable associated with the base station device;

determining a severity of an alarm issued by another base station device of the set of base station devices;

sending alarm data comprising the severity; and determining whether to extend or restrict a portion of a radio network controller service area of the multiple radio network controller service areas based at least in part upon the alarm data.

20. The computer readable storage device of claim 19, wherein the operations further comprise determining whether to extend or restrict the portion of the service area provided by the different base station device from the set of base station devices based at least in part upon the alarm data.

21. The computer readable storage device of claim 20, wherein the different base station device is adjacent to the base station device.

* * * * *